3,053,889
NITROBENZOATES OF IODOSOBENZENE
Robert E. Miller, Dayton, Ohio, assignor to Monsanto Chemical Company, St. Louis, Mo., a corporation of Delaware
No Drawing. Filed Aug. 17, 1959, Ser. No. 833,916
3 Claims. (Cl. 260—515)

The present invention relates to salts of iodosobenzene and to biological toxicant compositions comprising the same. More particularly the invention provides nitrobenzoates of iodosobenzene as new compounds and the method of producing the same.

I prepare the iodosobenzene nitrobenzoates in good yields by contacting iodosobenzene with a nitro-substituted benzoic acid substantially according to the scheme

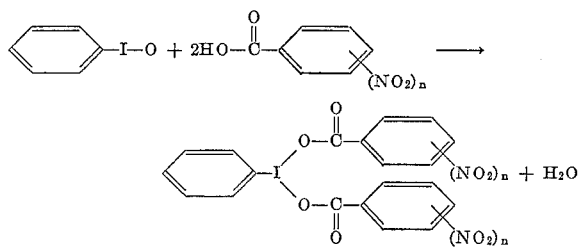

in which $n$ is an integer of from 1 to 3. The iodosobenzene component may be substituted in the benzene ring by one or more alkyl radicals.

Reaction of the iodosobenzene with the nitro-substituted benzoic acid is readily effected by mixing the iodosobenzene with said acid at ordinary or increased temperatures and allowing the resulting reaction mixture to stand until formation of the iodosobenzene bis(nitrobenzoate) has occurred. While, depending upon the reaction temperature employed as well as upon the quantities used and the degree of agitation, the reaction may be effected in the presence or absence of an inert diluent or solvent, generally I prefer to operate by dissolving one of the reactants in an inert solvent and then adding the other reactant to the resulting solution. As solvents or diluents which are useful for the present purpose there may be mentioned methanol, ethanol, ethyl or isopropyl ether, benzene, toluene, xylene, dioxane, hexane, etc. The reaction may be effected by allowing the reaction mixture of iodosobenzene and nitro-substituted benzoic acid to stand at ordinary room temperature; however, in order to effect completion of the reaction within a shorter period of time, heating at, say, a temperature of 50° C.–150° C. depending upon the nature of the diluent as well as the nature of the nitrobenzoic acid may be used. The iodosobenzene esters of the nitrobenzoic acids are readily crystallizable solids which separate from the cooled reaction mixture upon completion of the reaction.

According to the invention iodosobenzene thus reacts with 2-, 3- or 4-nitrobenzoic acid to give either the bis(2-nitrobenzoate) or the bis(3-nitrobenzoate) or the bis(4-nitrobenzoate) of iodosobenzene; with 2,3-, or 2,4-, or 3,4-, or 3,5-, or 2,6-dinitrobenzoic acid, iodosobenzene gives the corresponding bis(2,3-, 2,4-, 3,4-, 3,5-, or 2,6-dinitrobenzoates) of iodosobenzene. Similarly the bis(trinitrobenzoates) of iodosobenzene are prepared by the reaction of iodosobenzene with 2,4,5-, or 3,5,6-, or 4,5,6-, or 2,4,6-trinitrobenzoic acid to give the corresponding bis (2,4,5- or 4,5,6-, or 3,5,6-, or 2,4,6-trinitrobenzoates) of iodosobenzene.

The present iodosobenzene nitrobenzoates are stable, well defined crystalline compounds which may be advantageously employed for a variety of commercial and industrial purposes, e.g. as herbicides as bacteriostats, as oxidizing agents, and as motor fuel additives.

The invention is further illustrated by, but not limited to, the following examples:

*Example 1*

3,5-Dinitrobenzoic acid (21.2 g., 0.1 mole) was dissolved in a mixture of benzene and methanol, 8.0 g. (0.4 mole) of iodosobenzene was added to the resulting solution, and the whole was heated on the steam bath for about ten minutes. The reaction mixture was then allowed to cool and the product which crystallized therefrom was filtered to give 15.2 g. (61.0% yield) of the substantially pure iodosobenzene bis(3,5-dinitrobenzoate), M.P. 141–142° C., and analyzing 39.22% carbon as against 38.30%, the calculated value.

Other iodosobenzene nitro-substituted benzoates, e.g., the iodosobenzene bis(2-, 3-, or 4-nitrobenzoates), or the iodosobenzene bis(2,4,5- or 3,5,6-trinitrobenzoates), or the iodosobenzene bis(2,3- or 3,4-dinitrobenzoates) are obtained by using substantially the same procedure with the appropriate nitrobenzoic acid.

*Example 2*

This example shows testing of the iodosobenzene bis (3,5-dinitrobenzoate) of Example 1 against the bacteria *Micrococcus pyogenes* var. *aureus* and *Salmonella typhosa*. A 1% stock solution of the compound in a non-toxic solvent was added to a nutrient agar to give a test mixture containing 1 part of the compound per 1000 parts of the agar. Petri dishes were filled with the test mixture, and the plates thus prepared were then respectively inoculated with sail *pyogenes* and said *typhosa* organisms and incubated for 5 days at a temperature of 25° C. At the end of that time, inspection of the plates showed complete inhibition of growth of both the *pyogenes* and the *typhosa*, whereas "blank" inoculated nutrient agar plates showed profuse growth.

*Example 3*

This example shows evaluation of the iodosobenzene bis(3,5-dinitrobenzoate) of Example 1 as a foliage spray herbicide.

Aluminum pans 13" x 9" x 2" were filled with topsoil which had been screened through a ½" wire mesh and treated with methyl bromide soil fumigant to rid the soil of unwanted micro-organisms and seeds. The soil was then compacted to within ⅜" of the pan top and planted with from 3 to 20 seeds each of the following: wild oats, foxtail, brome grass, rye grass, barnyard grass, crab grass, field bindweed, radish, sugar beet, cotton pigweed, morning glory and buckwheat. The grass seeds were scattered randomly over two-thirds of the soil surface and the broadleafed seeds were scattered over the remaining ⅓ area of the pan. The seeds were then covered with ⅜" of the prepared soil mixture and the pan was leveled. The planted pans were placed in the exhaust hood and sprayed first with 30 cc. of an aqueous solution containing 1% by weight of a liquid fertilizer and 0.1% of octamethyl pyrophosphoramide. The fertilizer furnishes a uniform nutrition level and the amide prevents insect injury from aphids and mites. The pans were placed in ½" of water and allowed to absorb moisture through the perforated bottom until the soil surface was about one-half moist. The pans were then transferred to a wet sand bench in the greenhouse and kept there under ordinary conditions of sunlight and watering until the germinated seedlings were up to 21 days old. At the end of that time the seedlings were sprayed with 15 cc. of an emulsion containing an 0.5% concentration of the iodosobenzene ester. This emulsion had been prepared by adding a cyclohexanone solution of the calculated amount of the iodosobenzene ester to water in the presence of about 0.2% by weight, based on the weight of the total emulsion, of an emulsifier known to the trade as "Emulsifier L" (a mixture of a polyoxyalkylene derivative and an alkylbenzenesulfonate). The sprayed plants were then maintained in the greenhouse under ordinary conditions of sunlight and watering for 14 days. Observation of the sprayed plants at the end of that time showed that all of the broad-leafed plants had been killed whereas the grasses had been only slightly affected.

The presently provided iodosobenzene nitro-substituted benzoates may be applied as bacteriostats or herbicides by any suitable method. When used as sprays they may be employed in solution or in emulsion form. I have found that oil-in-water emulsions of said nitrobenzoates possess an improved tendency to adhere to the treated organisms and that less of the active ingredient, i.e., the iodosobenzene nitrobenzoate, is required to give comparable toxicity. Biological toxicant compositions may be prepared also by mixing the present esters with dusting materials such as talc, clay, lime, bentonite, pumice, etc.

What I claim is:

1. A compound of the formula 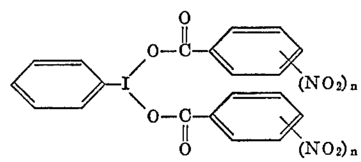 wherein $n$ is an integer of from 1 to 3.

2. Iodosobenzene bis(dinitrobenzoate).

3. Iodosobenzene bis(3,5-dinitrobenzoate).

References Cited in the file of this patent

UNITED STATES PATENTS

| | | |
|---|---|---|
| 2,536,983 | Owen | Jan. 2, 1951 |
| 2,773,091 | Burtner | Dec. 4, 1956 |
| 2,817,622 | Obladen et al. | Dec. 24, 1957 |
| 2,854,325 | Searle | Sept. 30, 1958 |
| 2,863,754 | Wain | Dec. 9, 1958 |
| 2,878,293 | Kinzer | Mar. 17, 1959 |
| 2,891,992 | Raecke | June 23, 1959 |
| 2,949,353 | Miller | Aug. 16, 1960 |

OTHER REFERENCES

Sidgwick: "Chemical Elements and Their Compounds," vol. II, p. 1250, 1952.

Whitmore, "Organic Chem." 2nd ed., May 1951, p. 629 (copy in Pat. Off. Lib.).